US009619219B1

United States Patent
Alford et al.

(10) Patent No.: US 9,619,219 B1
(45) Date of Patent: *Apr. 11, 2017

(54) INSTALLATION TESTING IN AUTOMATED APPLICATION DISTRIBUTION

(71) Applicant: Amazon Technologies, Inc., Reno, NV (US)

(72) Inventors: William J. Alford, Seattle, WA (US); Kenneth L. Hamer, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,514

(22) Filed: May 1, 2015

Related U.S. Application Data

(63) Continuation of application No. 13/940,126, filed on Jul. 11, 2013, now Pat. No. 9,027,016, which is a continuation of application No. 12/487,107, filed on Jun. 18, 2009, now Pat. No. 8,490,084.

(51) Int. Cl.
  *G06F 9/445* (2006.01)
  *G06F 9/44* (2006.01)
  *G06F 11/36* (2006.01)

(52) U.S. Cl.
  CPC ............ *G06F 8/61* (2013.01); *G06F 11/3688* (2013.01); *G06F 11/3692* (2013.01)

(58) Field of Classification Search
  CPC ..... G06F 8/61; G06F 8/60; G06F 8/65; G06F 11/3688; G06F 11/3664; G06F 11/3684; G06F 11/3692
  USPC .................................................. 717/177, 124
  See application file for complete search history.

(56) References Cited

U.S. PATENT DOCUMENTS

| | | | |
|---|---|---|---|
| 2003/0182656 A1* | 9/2003 | Leathers ................... | G06F 8/60 717/177 |
| 2008/0229284 A1* | 9/2008 | Castro ................. | G06F 11/3688 717/124 |
| 2009/0158272 A1* | 6/2009 | El-Assir .................... | G06F 8/61 717/177 |
| 2010/0292827 A1* | 11/2010 | Sievenpiper ........... | G06Q 10/06 700/110 |

* cited by examiner

*Primary Examiner* — Anna Deng
(74) *Attorney, Agent, or Firm* — Lee & Hayes, PLLC

(57) ABSTRACT

A system and method of deploying applications to networked computing environments is disclosed. Application packages and installation instructions are received by a deployment manager. The installation instructions include test instructions. Application packages are distributed in response to requests by developers and installation instructions executed on a target computing environment. Failure of an installation test provides an indication of issues with the application in the target environment. Records of failures received are stored for use by application developers.

18 Claims, 9 Drawing Sheets

Basic Method

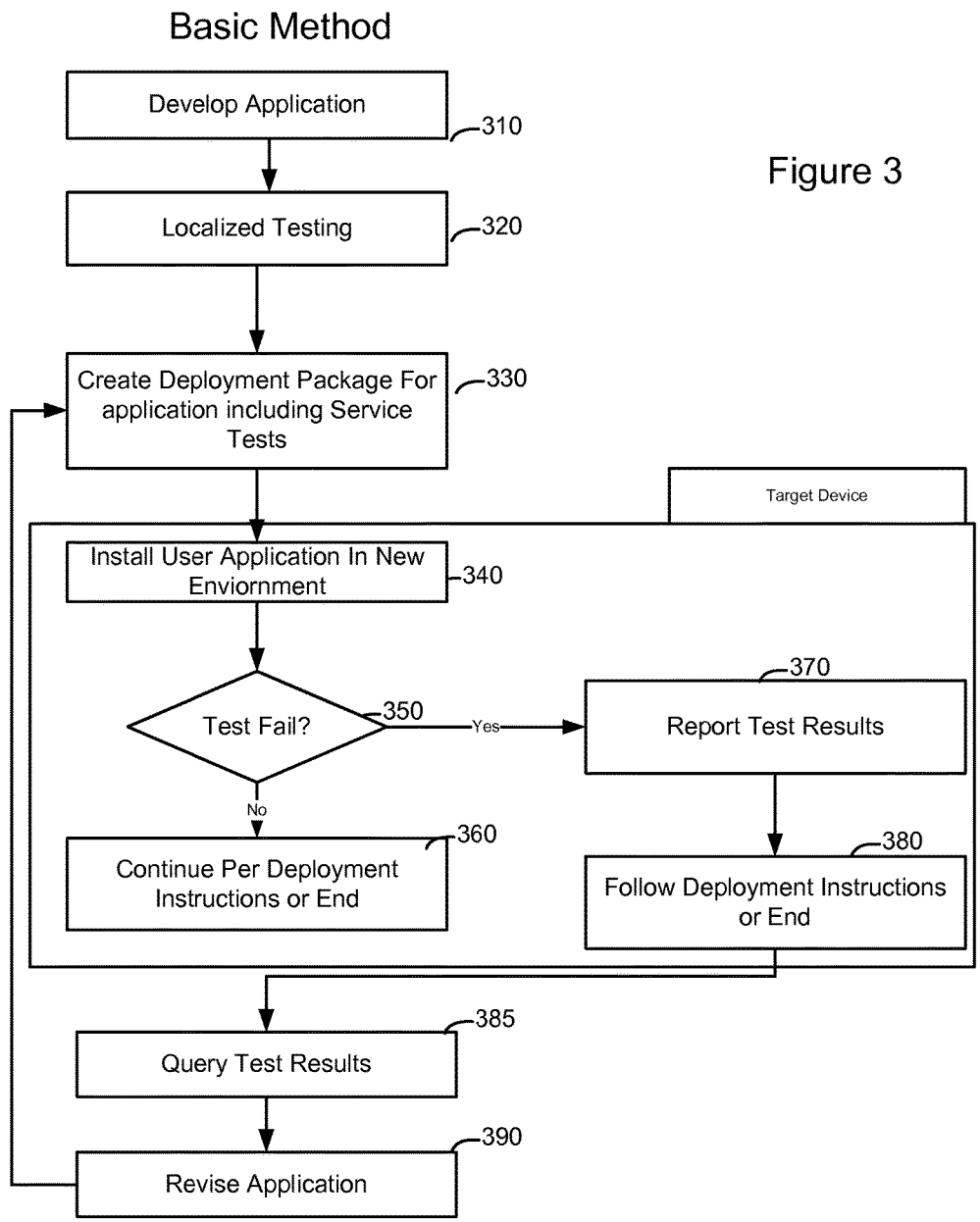

INSTALLATION TESTING IN AUTOMATED APPLICATION DISTRIBUTION

CROSS-REFERENCE TO RELATED APPLICATION

This application is a continuation of co-pending U.S. application Ser. No. 13/940,126, entitled "INSTALLATION TESTING IN AUTOMATED APPLICATION DISTRIBUTION," filed Jul. 11, 2013, which is a continuation of U.S. application Ser. No. 12/487,107, entitled "INSTALLATION TESTING IN AUTOMATED APPLICATION DISTRIBUTION," filed Jun. 18, 2009 (issued on Jul. 16, 2013 as U.S. Pat. No. 8,490,084), which are incorporated herein by reference for all purposes.

BACKGROUND

Software development and distribution in large enterprise computing environments may depend on a number of different developers contributing to the eventual product. A developer may depend on services provided by other developers or environments within the enterprise. Often, an individual developer has little or no control over services which are provided by other developers.

Software development which depends on other services and environments makes it difficult to test whether an application will function in the computing environment in which it is installed. Typically, this means applications are distributed into a new environment, and run for some amount of time to determine whether any problems exist with the application in that environment. While localized application installers can perform limited testing of whether installation in the new environment is suitable, application errors may result from network dependencies or application functions in the environment which may not be apparent during an initial installation.

BRIEF DESCRIPTION OF THE DRAWINGS

FIG. 3 illustrates a method for distributing and testing applications.

DESCRIPTION

Technology is presented which allows for testing of automated application deployments. Testing can occur at different stages of deployment and at different stages of the installation. Software developers may create application packages and deployment instructions, with each package including one or more installation tests. A deployment manager controls distribution of application packages to computing environments. Test instructions included in the deployment instructions perform sanity or validation testing on before, during or after an installation of the application, and errors are stored in a database accessible to the developer. Application testing can therefore occur at different stages of application development, and for each level of application deployment within an enterprise computing environment.

The technology is suitable for use in developing software designed for remote installation in a virtual or hardware based computing environment. A computing environment comprises one or more virtual or hardware-based processing devices including a common operating environment. The operating environment may include an operating system and commonly configured services. Any number of different operating systems may be utilized with the present technology, including but not limited to various configurations of Linux, Unix, Microsoft Windows Server, and other server operating systems.

Applications can consist of server-type applications, such as database servers, web servers, virtual machine environments, media servers and the like, or user-centric applications, such as word processing, spreadsheet, presentation, contact manager, communications and the like.

Figure 8:
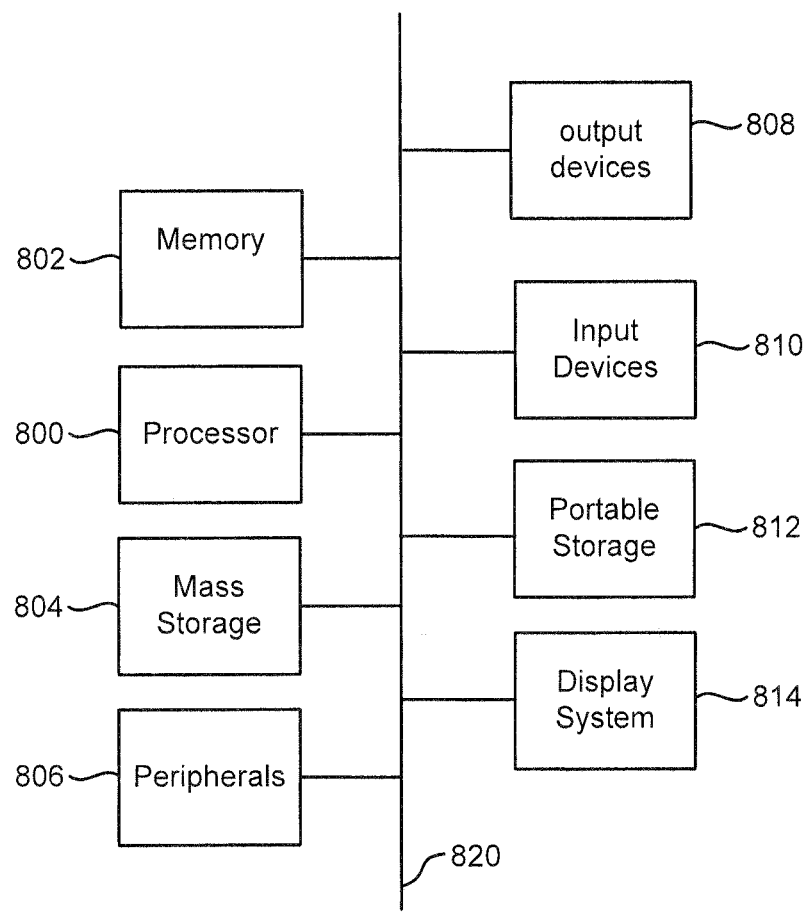
FIG. 8 illustrates an exemplary processing device.

Computing environments may be grouped together within an enterprise computing environment. An enterprise computing environment typically includes several types of computing environments, including a production environment comprised of a number of servers designed to provide application services to end users, and different levels of development or testing environments. Each computing environment may be overseen by an administrator—an individual or entity which is authorized to manage the computing environment. A computing environment may comprise a single processing device, or multiple processing devices. An exemplary processing device is illustrated in FIG. 8.

Developed applications are deployed to various computing environments in a standard and repeatable fashion. The computing environment to which the application is to be installed is referred to as a target computing environment. Each installation of an application to a computing environment is considered a deployment. The technology allows application developers to create deployments for one or more target computing environments, and test application installation in the deployment at each of the target computing environments. Such testing can occur at all levels of computing environments in an enterprise, from the initial, local development environment though various development and testing environments and the production environment.

A deployment manager is used to control deployments. To ensure installation and operation at each target environment functions as intended, a series of test services is provided by the deployment manager. Using the test services, developers can create application deployments which conduct one or more sanity and/or validation tests before, during and/or after installation of an application to ensure the application functions correctly. Failure of any of the test triggers an error, the effect of which is controlled by the deployment.

Figure 1:
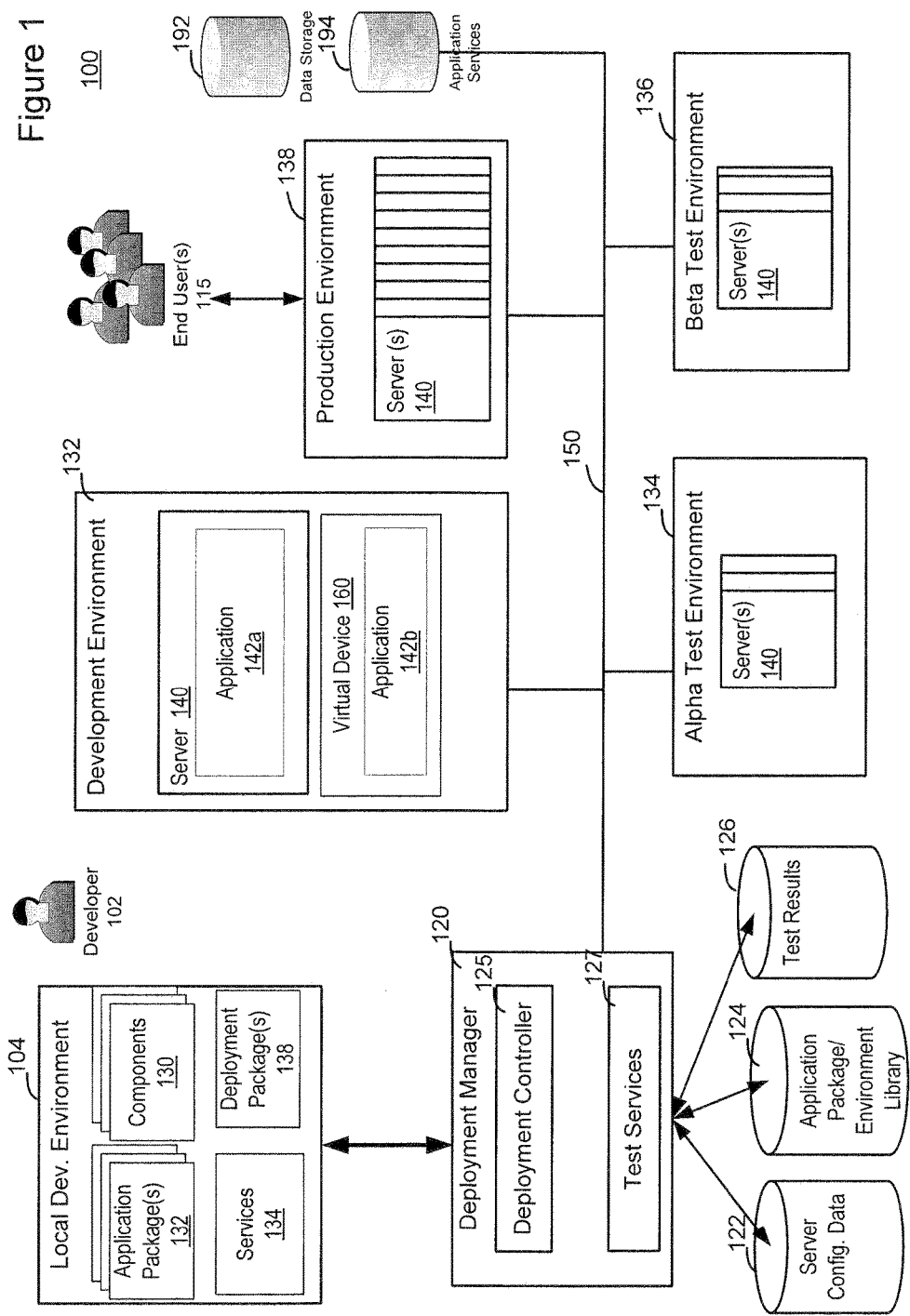
FIG. 1 illustrates a first computing environment in which the present technology may be implemented.
Figure 2:
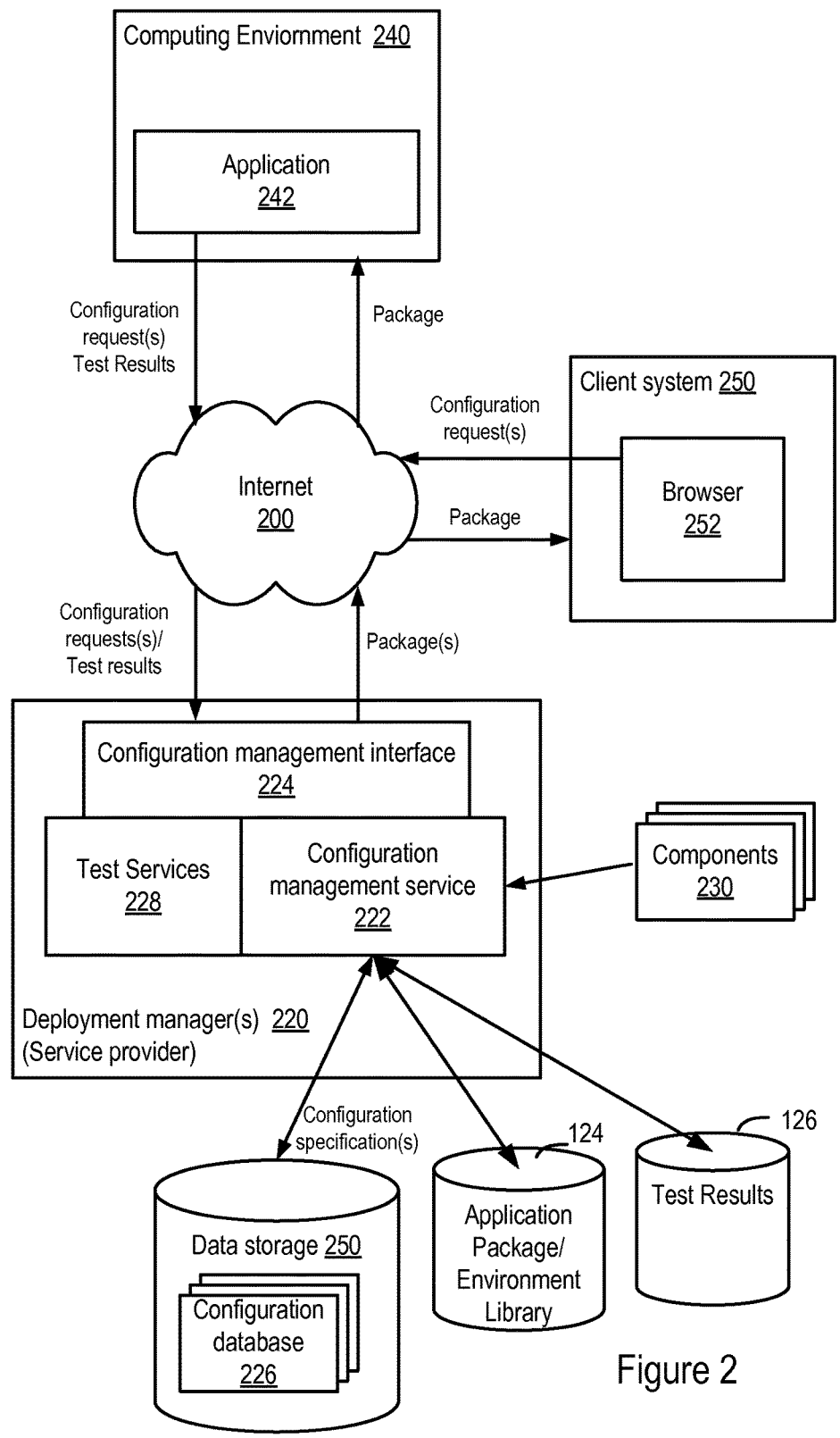
FIG. 2 illustrates a second computing environment in which the present technology may be implemented.

FIGS. 1 and 2 illustrate exemplary systems where the technology may be used. FIG. 1 illustrates an enterprise computing environment 100 wherein a developer 102 uses a local development environment 104 to produce applications for distribution to target computing environments within the enterprise. Applications are designed for use in a production environment 138 by end users 115, and are developed in a local development environment 104. In another alternative, application development may be provided as a service, with the testing functions incorporated into the service offering. FIG. 2 illustrates a configuration management service implemented as a web service in a networked environment.

FIG. 1 shows an enterprise computing environment 100 which provides applications for use by end users 115. In FIG. 1, five computing environments are illustrated: a local development environment 104, a network development environment 132, an alpha test environment 134, a beta test environment 136 and a production environment 138. It should be understood that the nature and number of computing environments is merely illustrative. Enterprise computing environments may contain any number of different release stages for applications, and computing environments for testing and evaluating the applications.

Developer 102 interacts with a local development environment 104 to create applications from application components 150. Components 150 may be assembled into application packages 152 and deployments 158. Each application package 152 can include components 150 comprising an executable, a binary image, a library, configuration files, or any type of file or data used to create an application or operating environment. Components 150 may include, but are not limited to, installers, applications, programs, software modules, drivers, data files, image files, scripts, plug-ins, or any other type of digital component that may be necessary or desired for installation on the target system. Application packages can include metadata providing system guidance information such as recommended operating system versions associated with an application, approved operating system hardware configurations, and operating system status information (e.g. "released", "recalled", "deprecated"). Other metadata may include compatibility information relative to interoperability with other applications, the suitability for use of an application on an operating system, and installation rules for applications and operating systems.

Each deployment 158 may comprise one or more application packages and instructions for installing the application package to one or more target computing environments. Deployments may also include test instructions as described below. The test instructions provide feedback on test failures to test services 127 provided a deployment manager 120, which can be used by the developer to correct issues with the application or deployment.

Initial testing of an application may be performed in the local development environment 104 against local environment services 154 and processes. However, many applications require services provided by other applications or resources available within the enterprise. As such, various testing or development computing environments offering varying levels of access to such services may be provided within the enterprise.

Computing environments 132, 134 and 136 generally illustrate different levels of testing environments within the enterprise 100 to which an application may be installed, prior to release to a production environment 138 for use by end users. Each computing environment 132, 134 and 136 may contain one or multiple processing devices. Illustrated in development environment 132 is a server processing device 140 including an installed application 142a and virtual machine processing device 160 including an installed application 142b. It will be understood that any number of physical or virtual processing devices may be included in development environment 132. Similarly, any number of physical or virtual servers may be included in alpha test environment 134, beta test environment 136 or production environment 138.

Virtual processing devices are maintained on one or more hardware devices. Each virtual processing device may comprise a partition of physical hardware into a processing environment including processing resources, storage resources, networking resources and memory resources. Each physical device can be divided into a multitude of virtual servers each of which has the appearance and capability of a dedicated computing device. Each virtual processing device can run its own operating system and applications, and can be independently rebooted, created and destroyed. As such, each virtual processing device may comprise a target device for application installation.

Generally, a virtualization technology allows multiple operating system instances to run concurrently on a single computer, sharing the resources of that computer. Any number of suitable virtualization technologies may be utilized in accordance with the present technology to allow separation of requests made to an operating system from the physical delivery of a response to that request from a hardware device. The system management server includes instructions to allow the creation, maintenance and destruction of virtual servers on hardware.

Development environment 132 comprises a development computing environment having access to network components, applications and services which may be required by an application. In FIG. 1, exemplary network services may include additional data storage resources 192 or other application services 194. Data storage resources 192 may comprise physical or virtual storage space for data used by an application. Application services 194 may include database application services provided by the enterprise for application developers. Likewise, alpha test environment 134, beta test environment 136 and production environment 138 have access to storage resources 192 and application services 194. Alpha test environment 134 and beta test environment 136 may be distinguished within the enterprise by the size of the computing environments, the number of users allowed access to applications within the computing environment, and the state of development of applications installed in each environment.

FIG. 1 also illustrates a deployment manager 120 which manages application installation on target environments. Deployment manager 140 may comprise code for instructing one or more computing devices (illustrated in FIG. 8) to complete the functions described herein. In general, the deployment manger 120 allows developers and administrators to control the installation of new applications and operating environments in target computing environments. Deployment manager 120 includes a controller 125, test services 127, an application package and environment library 124, server configuration data 122 and test result data 126. The environment library 124 and server configuration data 122 are used by the deployment manager 120, as described below.

An installation target may comprise a computing environment, or individual processing devices within a computing environment. As such, various different types of deployments are possible. A deployment may provide instructions for installation of an application package on a single server within an environment, a subset of servers within an environment, or an entire environment. Deployments may include instructions to sequentially install applications to a series of servers, known as a "rolling" deployment. In a rolling deployment, an application deployment may target multiple servers, installing and verifying installation on sequential sets of servers before proceeding to a next set of servers.

Deployment manager 120 includes a deployment controller 125 and test services 127. Application packages are contained in the library 124, and may comprise an operating system, and application, or an operating system in combination with one or more applications. Each application package is comprised of one or more components 150 which are used to create the application package. The library 124, maintained in the deployment manager 140, is a catalog of applications which may be deposited by developers for deployment. Distribution via the deployment manager allows for a consistent application installation within each environment, tracking of the installed application and server configuration, and centralized control over the application distribution and testing process. This allows approval and auditing before releasing an application to a production environment 138 for use by end users. The deployment manager 140 may operate on a separate physical server, or within its own virtual server within the enterprise computing environment. The deployment manager also maintains server configuration data 122 which reflects information on each of the virtual servers or physical servers in the enterprise computing environment 100.

Deployment controller 125 communicates with target systems to control execution of an application deployment. Generally, application packages are checked into the application package/environment library prior to deployment. Upon receiving an deployment 158, controller 125 manages the delivery an application package 152 to the target computing environment, instructs the target to install the application package, monitors communications relating to the deployment (including test messages, described below), and stores information in the server configuration database 122 and test results database 126. Deployment controller may initiate installation instructions on target computing environments by instructing the target computing environment to execute commands necessary to install an application package.

In accordance with the technology, developers can insert test instructions in a deployment or an application package to perform sanity and validation testing of an application before, during and after installation of the application in the target environment.

Any number of different testing instructions may be inserted. In one embodiment, two general types of testing instructions—sanity test instructions and validation test instructions—are provided. A sanity test is a basic test to quickly evaluate the validity of a particular function of a computer program, system, calculation, or other analysis to ensure that a system will work as expected. A sanity test will determine whether, for example, a service or component of an operating system is in place. A validation test is generally understood to be a more advanced type of test to determine whether functional elements of an operating system or application work as expected. For example, a logon to an operating system or the creation of a new entity in a database with success are validation tests.

FIG. 2 illustrates an application development environment implemented as a web service in a networked environment. The functions of the local development environment 104 are performed by a service provider and offered to developers as a service.

One or more deployment managers 220 may host an instance of a configuration management service 222. An exemplary processing device which may host an instance of a configuration management service 222 is illustrated in FIG. 8. Functions of the configuration management service 222 are accessible to developers via a client system 250 via a network or Internet 200 through a configuration management interface 224 to the configuration management service 222. The configuration management interface 224 may be a standard network interface. In one embodiment, configuration management interface may be implemented as a web service interface.

Developers can determine desired or necessary application package for various computing environments. FIG. 2 illustrates computing environment 240 as a target computing environment. In the implementation of FIG. 2, computing environment 240 may constitute any of a number of test level environments (such as those illustrated with respect to FIG. 1) or a production environment. In a manner similar to the implementation of FIG. 1, deployments of application packages may be delivered via the network to the local storage of any such system and installed thereon.

Configuration management service 222 is configured to build and deliver different application packages and deployments for installing a variety of different, configurations to target systems. Deployment manager 220 may be configured to build and deliver packages for installing a particular configuration of an application.

For each received configuration request from a developer interfacing with a client system 250, the configuration management service 222 may build a specific application package including one or more particular components 230 for implementing the particular configuration indicated by the configuration request on the target computing environment. For example, one package delivered to environment 240 may include one or more components for implementing a requested office application suite. Components included in a package may be provided by the service provider and/or by one or more third parties. The components may be obtained locally or from remote locations, e.g. from other servers or locations on an intranet or on the internet.

As an example, a developer may use client system 250 to specify application components in an application 242 to be installed on environment 240. The developer may then create a deployment package of instructions including test instructions to distribute the application package. The developer may use a browser 252 on client system 250 to specify a configuration to be installed. Browser 252 may present a web page or pages that may allow the client to specify or select a desired configuration. Browser 252 generates and sends the configuration request to configuration management service 222 in one or more messages in accordance with configuration management interface 224.

Upon receiving a configuration request, configuration management service 222 may collect one or more components 230 necessary for the configuration and compile the components 230 into an application package. Information provided in the configuration request may be used by configuration management service 222 to determine particular components for inclusion in the package for particular target systems. The components may be obtained locally or from remote locations, e.g. from other servers or locations on an intranet or on the internet. An example of an intranet may be a Local Area Network (LAN) of a company or company site. The package may then be delivered via the network (e.g., Internet 200) to the one or more specified target systems. The information may be delivered according to specified communications information for the specified target systems. The communication of the package from the configuration management service 222 to the target system(s) may be secured, for example using private key/public key encryption or other means of securing communications over a public network. In one embodiment, the security to be used to communicate with a target system may be specified by the client.

Once a package is received on a target system, the package may then be installed. The deployment manager 220 may initiate or otherwise control the installation of the configuration, or alternatively the installation of the configuration may be performed automatically by the package.

Configuration management service 222 may generate a configuration specification according to the configuration request and store the configuration specification in configuration database 226. Configuration database 226 may include configuration specifications received from multiple clients, and thus may be indexed by client. In one embodiment, the client identifiers may be used to index the configuration specifications. In addition, the configuration specifications may be provided with identifiers used to index and distinguish the particular configuration specification from other configuration specifications requested by particular clients. The stored configuration specifications may be used by the configuration management service 222, for example, to track configurations for clients and to verify installed configurations on target systems upon client request for verification.

Where a developer specifies sanity or validations testing in the application package or deployment, test results are stored in the test results database 126. Completed application packages may be stored in the application package/environment library 124.

FIG. 3 illustrates an exemplary method for developing applications in conjunction with the present technology. FIG. 3 will be described in conjunction with the environment disclosed in FIG. 1, and modifications to the method illustrated in FIG. 3 which may be enabled by the service environment disclosed in FIG. 2 will be noted.

At 310, an applications developer creates a number of components 150 which are necessary to provide a complete application for use in a processing environment. Component testing and application package testing occurs in a localized environment at 320. The local environment testing is conducted by the developer to ensure that the application functions as intended based on application services and processes which are running in a local development environment. It should be noted that application development and localized testing may be conducted in the localized development environment 104 shown in FIG. 1, or may be conducted by a developer using the client system 250 in conjunction with the configuration management service 222. In conjunction with the system of FIG. 2, application components 230 are generally provided by a service provider.

Once an application is created, a deployment for the application package is created at 330. In accordance with the technology, the deployment can include one or more sanity or validation tests within the deployment instruction. Any number of different deployment types can be created at 330. A simple deployment type would be an installation of a single application package on a single target processing device. A more complex deployment would be distribution of an application package to multiple processing devices, or multiple computing environments.

Once the deployment is created at 330, the application can be installed at 340. During installation, as explained below, the deployment runs through the deployment instructions in the deployment package and install the application in a target environment. Application specific installation instructions may also be contained within the application package.

If test instructions are included, during the installation, one or more tests are conducted. If no test failure occurs, the deployment completes each instruction in the deployment until finished at 370. If a test failure occurs at 350, the test results is reported at 370 and an action taken based on instructions in the deployment defining the action to take based on the failure at 380. For example, the deployment package may include an instruction to cease the deployment and uninstall existing components of the application to restore a target to its state prior to the application deployment. Depending on the nature of the test, the deployment may include an instruction to proceed with the application installation. In a more complex deployment, where multiple application packages are being installed on multiple targets, such as a rolling deployment, the instruction may depend on the location in the rolling deployment that the application has reached.

Test results can be queried by the developer at 385 and revisions to the application or the deployment package can be made at 390. As described below, reporting test results at 370 may be provided to a data structure via a messaging format, allowing developers to determine where in an installation process failure occurred and the nature of the service which caused the installation failure.

Figure 4A:
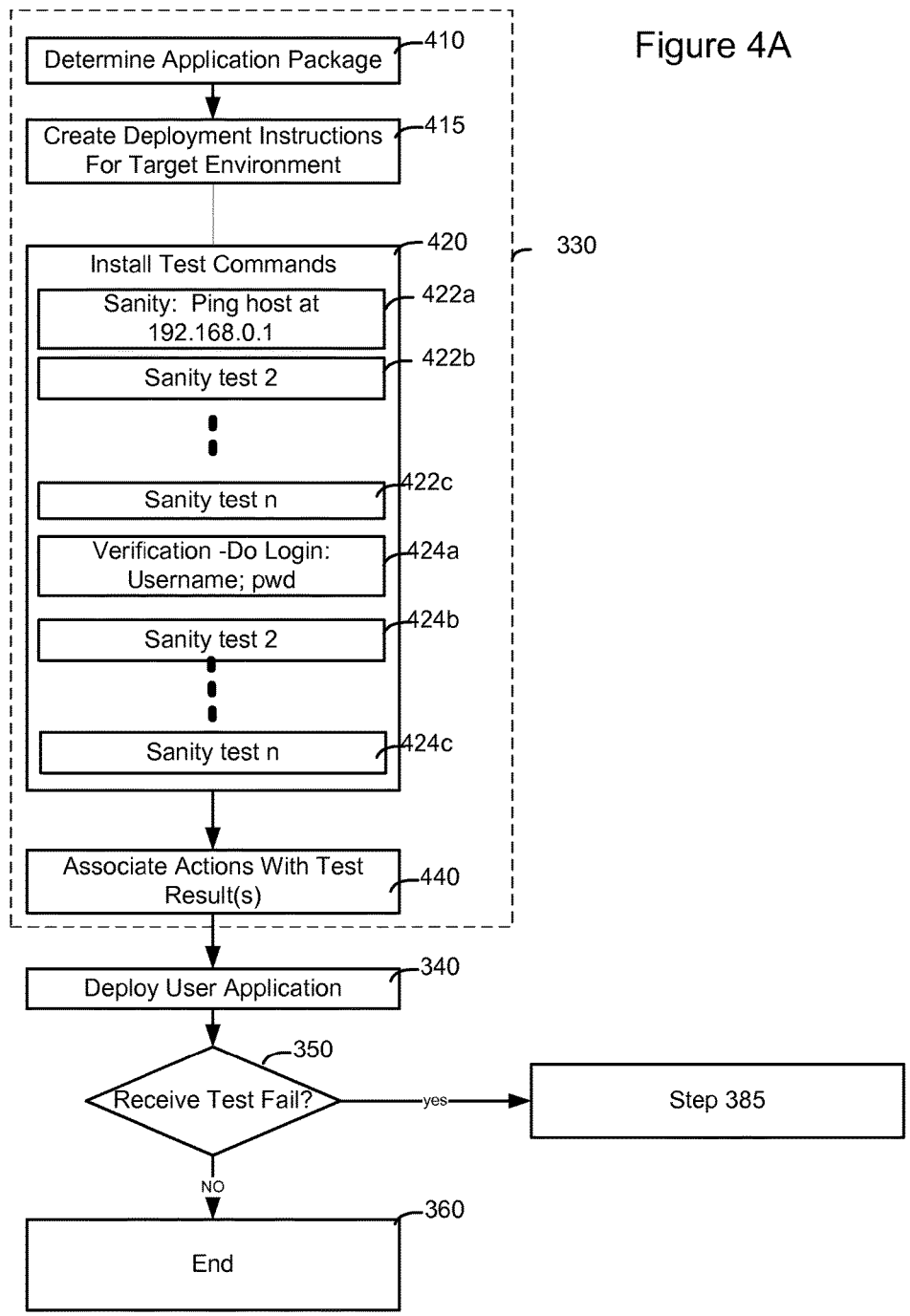
FIG. 4A illustrates a first method for creating application packages with built in testing functions.

FIG. 4A illustrates a first method for creating a deployment package discussed above at 330. At 410, an application package is determined. The application package can be a newly created package from a developer or a package referenced in application library 126 Deployment instructions are created at 415. The deployment instructions may specify the target processing device or devices and installation order for multiple application packages. At 420, test commands are included in the deployment instructions. Test commands can include any number of sanity tests 422a-422c and verification tests 424a-424c. An exemplary sanity test 422a includes an instruction to ping a particular host device. A ping may be necessary to ensure that a particular service is available at a particular address and that the target device can actually communicate via network. An exemplary validation test 424a determines whether a login can be created to the application. Any number (0–n) of sanity and validation tests may be included in the deployment.

At 440, failure actions are associated with test results. If an application fails one of the sanity or validation tests included at 420, the deployment will include instructions as to what to do with the particular application. Once the deployment is created, the application is deployed as discussed above at 340.

Figure 4B:
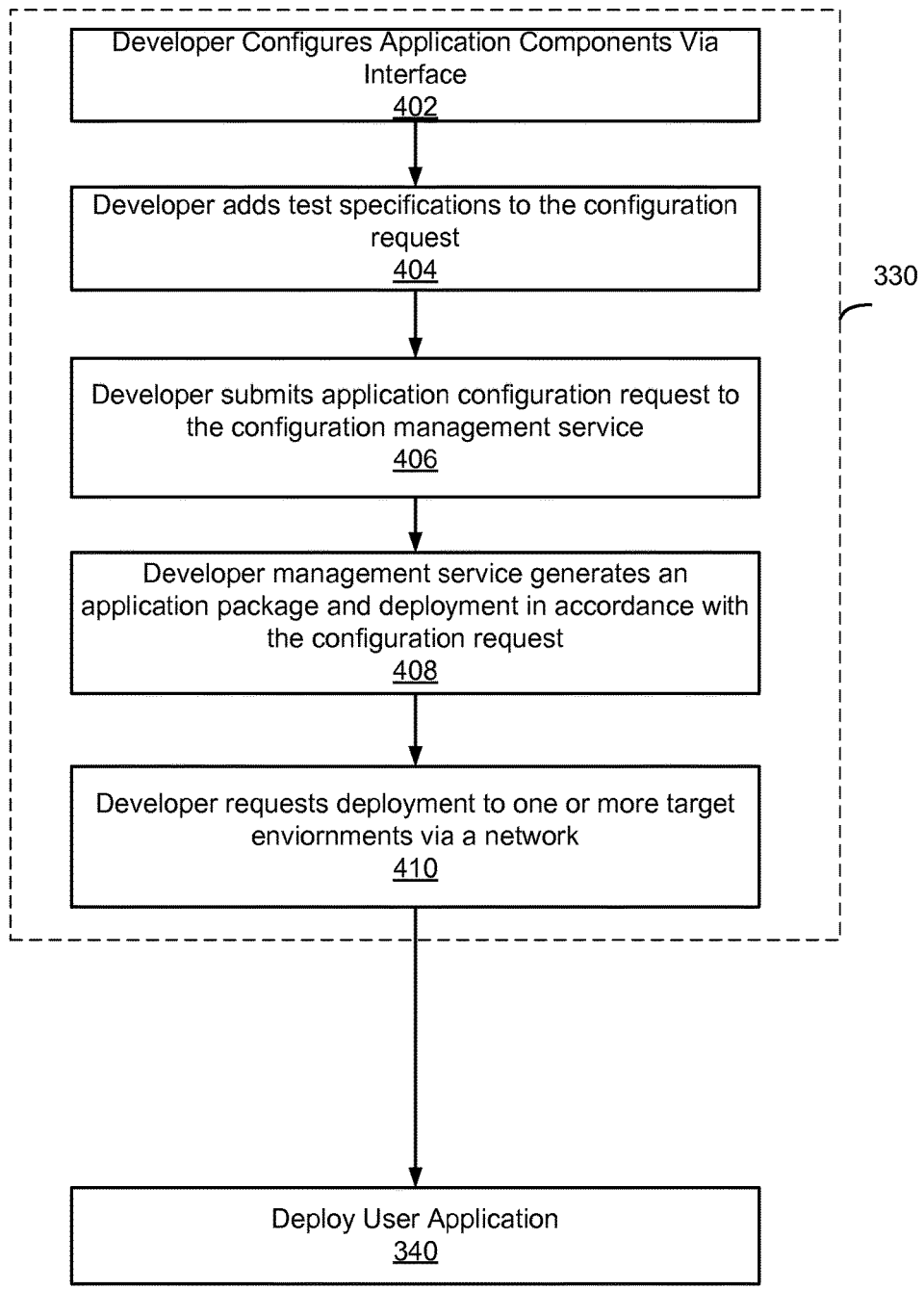
FIG. 4B illustrates a second method for creating application deployment packages with built in testing functions.

FIG. 4B illustrates a method for creating the deployment package utilizing the service environment of FIG. 2. At 402, a developer configures the application components via the interface. The developer adds test specifications to the test request at 404 in a manner similar to that disclosed above with respect to 420. At 406, the developer submits the application configuration request to the configuration management service and the configuration management service generates an application package and deployment in accordance with the configuration request at 408. When deployment is requested at 410, the configuration management service sends the package to one or more target processing devices in the network at 340.

Figure 5:
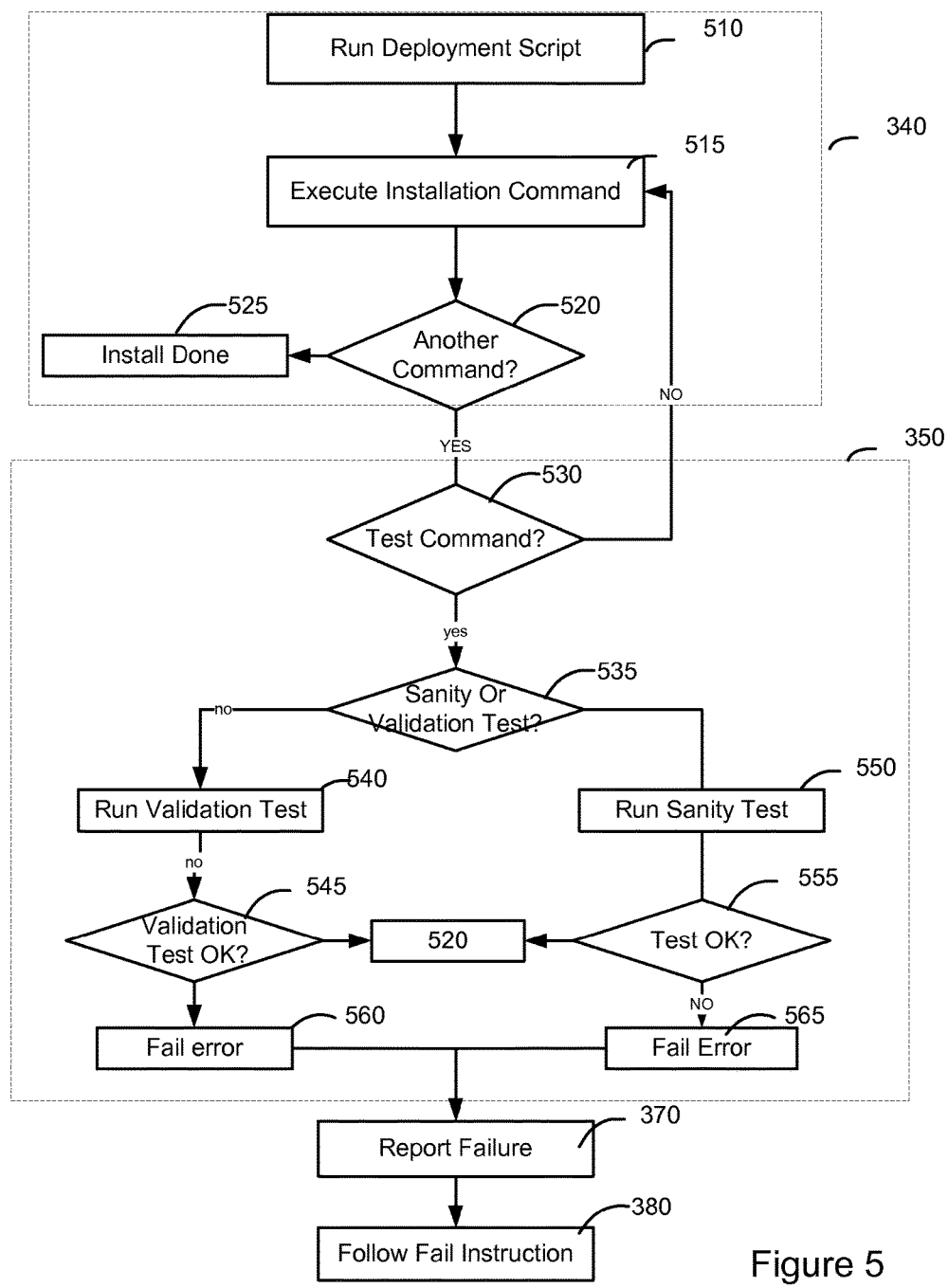
FIG. 5 illustrates deployment and testing functions in a deployment package.

FIG. 5 illustrates the processes at 340 and 350 noted above with respect to FIG. 3 in additional detail. When a deployment installation occurs on a target device, the deployment instructions are run at 510. Each command in the deployment or application package is executed at 515 until no additional commands are included in the deployment at 520 and the installation finishes at 525. Commands may include instructions to copy files, packages or components, execute application packages, create data partitions, create new virtual processing devices, configure processing devices and the like.

At 530, for each command in the deployment or application package, a determination is made as to whether the instruction is a test command. If the command is a test command at 530, in one embodiment, the command will be a sanity test or a validation test at 535. If a sanity test is requested, the sanity test will be run at 550 and a determination is made whether or not the test succeeds at 555. Likewise, if a validation test occurs at 540 a validation test succeed or fail 545. A failure of either test will generate a failure specific error at 560, 565, which will be sent to the test results database 126 at 370 Again, action is taken based on the fail error at 380 based on an instruction is provided in the deployment.

Figure 6A:
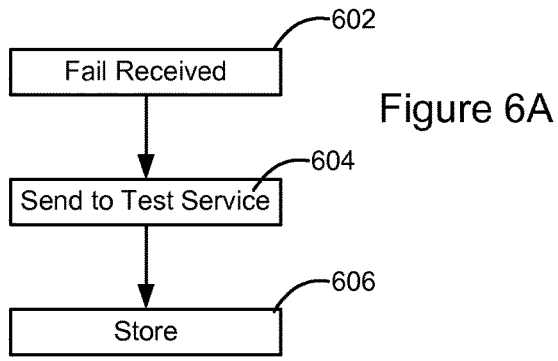
FIG. 6A illustrates a first alternative for storing error messages to a data store.
Figure 6B:
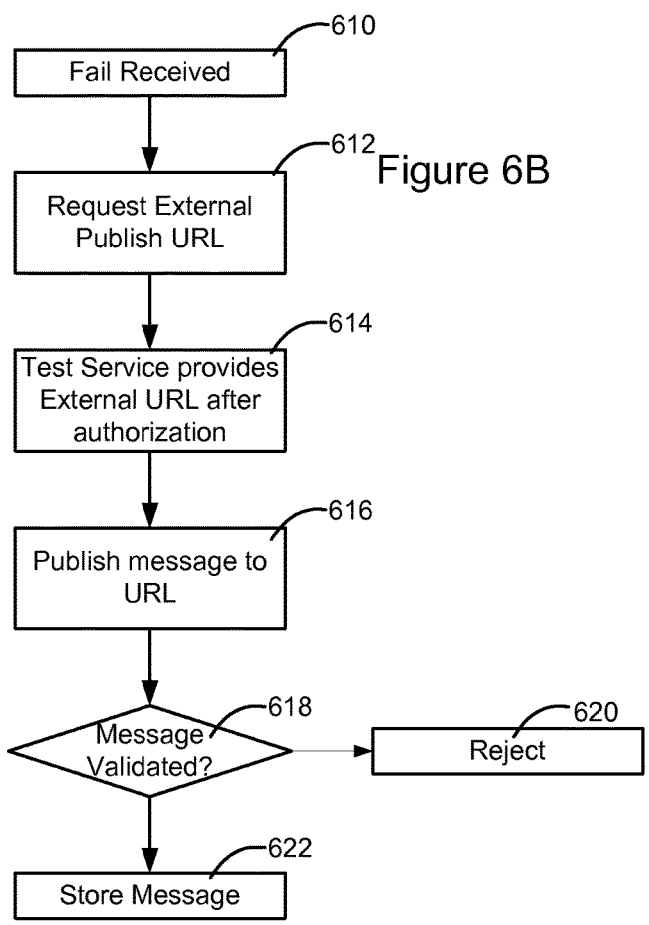
FIG. 6B illustrates a second alternative for storing error messages to a data store.

FIGS. 6A and 6B represent two alternatives for implementing the failure reporting to a data structure at 370. In FIG. 6A, where a failure is reported between servers which are coupled by a secure network, upon receipt of a fail notice at 602, the fail notice may be sent to the test service database at 604 and can be stored at 606 in the test service database.

FIG. 6B represents the method for publishing test results to a test results database 126 when the target computing environment is in an unsecure environment, such as the situation illustrated in FIG. 2 where the target computing environment 240 is coupled by the Internet. When a fail is generated at 610, the test services in the deployment manager may receive a request for an external publishing URL at 612. The external publish service component of the test services will provide an external URL at 614 after authorizing the request and create a pre-signed URL for the requested data store 126. Once the URL is returned, standard networking techniques can be used to publish an error message to the URL at 616. When the message is received by the test services at 618, if the message is validated, the message information concerning the error will be stored at 622.

Each test result record may include, for example, a deployment identifier, an application package identification, a computing environment identification, a time stamp, and a record of the type of test which failed. This information may be organized in any of a number of messaging formats and stored in data store 126 in any number of database formats.

As noted above, various types of deployments can be created. The testing services of the present technology therefore provide the capability to test application deployment at various stages of application development and deployment.

FIGS. 7A-7D illustrate various uses of the test services in different stages of application development and deployment.

Figure 7A:
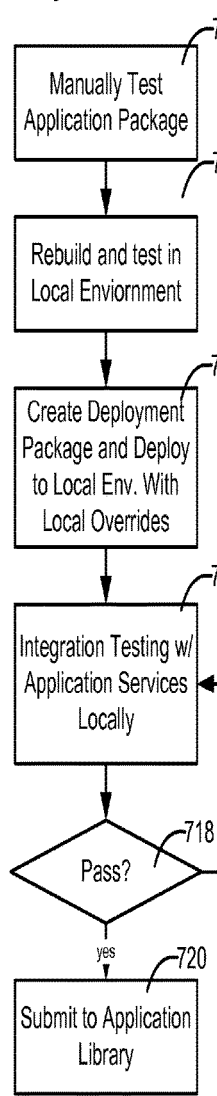
FIGS. 7A through 7D illustrate various deployment scenarios and instances where testing can be employed in the deployment scenario.

In one use case, a developer may choose to create a deployment to deploy an application to a local development environment. FIG. 7A illustrates uses of the test services in this scenario, before submitting the application into creation of a deployment for network computing environments. At 710, manual tests of an application package are performed in the local development environment. This may include ensuring that the components to be assembled into an application package work as intended in the local environment. Rebuilding and testing occurs at 712 until the application works as intended. Following the rebuilding and testing in the local environment, a local stage deployment is created at 714 and deployed to a local environment using the testing services as hooks into local environment overrides to the installation process. In this context, the testing services can be used to create an application package which is installed in the local environment. Errors generated by testing instructions can be generated and stored as noted above, with failure instructions calling local installation overrides in the local environment. Continuous integration testing of the local deployment occurs at 716 based on application services local to the local environment. Once application testing passes at 718, the application may be submitted to the application library 126 at 720.

Figure 7B:
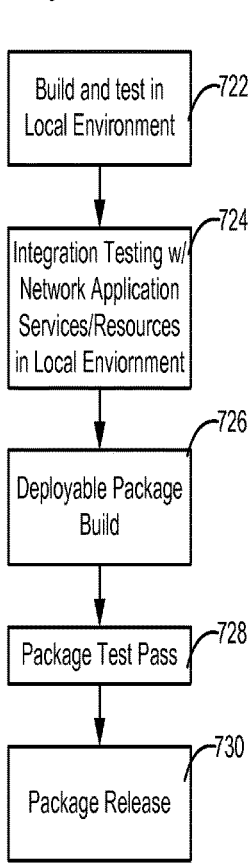

FIG. 7B illustrates the testing of an application using network application services and resources before creating deployable packages. At 722, building and testing occurs on a local environment in a manner similar to that set forth above with respect to 712, except that network resources (such as network storage resources 192 and application resources 194, or other enterprise level code) is incorporated into the application. Integration testing with application services in a local environment occurs at 724. Once this is completed, at 726 a deployable package build occurs and once the package test is passed at 728, the package is released at 730.

Figure 7C:
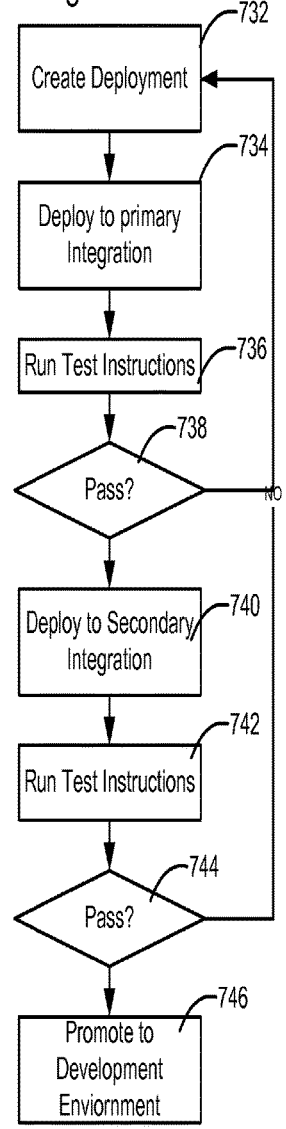

FIG. 7C illustrates use of the testing services before deploying an application package into a development environment. FIG. 7C illustrates a staged deployment, where integration testing with other components or network resources occurs and the deployment must pass each level of integration before moving to the next stage. A deployment is created at 732 and the deployment is installed into a primary integration environment at 734. Test instructions within the primary integration portion of the installation occur at 736 and if the installation passes the test instructions at 738 a secondary integration installation stage occurs at 740. A second set of installation instructions occurs at 742 and if the installation instructions pass then the application can be loaded at 746 to the production environment. It will be recognized that the steps 734-738 and 740-744 can be repeated for any number of multiple integration stages before promotion and installation to a development environment is completed. It should be further noted that the process illustrated in FIG. 7C can be implemented for any level of deployment or testing computing environment.

Figure 7D:
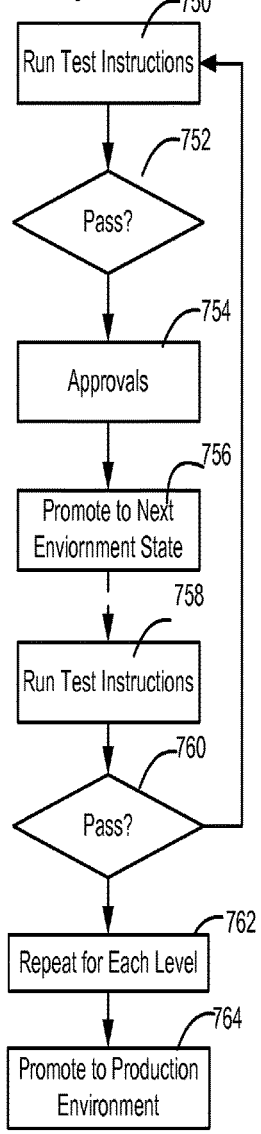

FIG. 7D illustrates promoting a deployment from one environment to another environment, and eventually to a production environment. Test instructions may be installed and run at 750 during each target computing environment installation. If all tests pass at 752, approvals may be sought at 754. The approvals may be human or automated approvals to deploy the application to the next level computing environment at 756. Test instructions are again run at the next environment state at 758, and repeated for each level environment at 762 until all approvals have been met to promote the application to a production environment.

FIG. 8 is a high-level diagram of the computing system which can be used to implement any of the processing devices of FIG. 1 and servers of FIG. 8. The computing system of FIG. 8 includes processor 800, memory 802, mass storage device 804, peripherals 806, output devices 808, input devices 810, portable storage 812, and display system 814. For purposes of simplicity, the components shown in FIG. 10 are depicted as being connected via single bus 820. However, the components may be connected through one or more data transport means. In one alternative, processor 800 and memory 802 may be connected via a local microprocessor bus, and the mass storage device 804, peripheral device 806, portable storage 812 and display system 814 may be connected via one or more input/output buses.

Processor 800 may contain a single microprocessor, or may contain a plurality of microprocessors for configuring the computer system as a multiprocessor system. Memory 802 stores instructions and data for execution by processor 800. If the technology described herein is wholly or partially implemented in software, memory 802 (which may include one or more memory devices) will store the executable code for programming processor 800 to perform the processes described herein. In one embodiment, memory 802 may include banks of dynamic random access memory, high speed cache memory, flash memory, other nonvolatile memory, and/or other storage elements.

Mass storage device 804, which may be implemented with a magnetic disc drive or optical disc drive, is a nonvolatile storage device for storing data and code. In one embodiment, mass storage device 804 stores the system software that programs processor 800 to implement the technology described herein.

Portable storage device 812 operates in conjunction with a portable nonvolatile storage medium, such as a floppy disc, CD-RW, flash memory card/drive, etc., to input and output data and code to and from the computing system of FIG. 8. In one embodiment, system software for implementing the present technology is stored on such a portable medium, and is input to the computer system via portable storage medium drive 812.

Peripheral devices 806 may include any type of computer support device, such as an input/output interface, to add additional functionality to the computer system. For example, peripheral devices 806 may include a network interface for connecting the computer system to a network, a modem, a router, a wireless communication device, etc. Input devices 810 provide a portion of a user interface, and may include a keyboard or pointing device (e.g. mouse, track ball, etc.). In order to display textual and graphical information, the computing system of FIG. 8 will (optionally) have an output display system 814, which may include a video card and monitor. Output devices 808 can include speakers, printers, network interfaces, etc.

The components depicted in the computing system of FIG. 8 are those typically found in computing systems suitable for use with the technology described herein, and are intended to represent a broad category of such computer components that are well known in the art. Many different bus configurations, network platforms, operating systems can be used. The technology described herein is not limited to any particular computing system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   at least one computing device processor; and
   a memory device including instructions that, when executed by the at least one computing device processor, enable the computing system to:
   receive a configuration request that specifies a configuration to be implemented at a target computing system;
   compile at least one component into an application package, the at least one component including at least one or more software modules for the configuration to be implemented at the target computing system;
   determine an instruction for installing the application package, the instruction specifying at least one test to be performed with the application package at the target computing system, wherein the at least one test for installing the application package includes one or more sanity tests and one or more validation tests, the one or more sanity tests being configured to determine whether a service referenced by the application package is available at an address, and the one or more validation tests being configured to determine whether one or more functional elements operate within a determined range of functional values;
   send the application package and the instruction to the target computing system;
   cause the application package to be installed at the target computing system; and
   cause the at least one test to be performed at the target computing system, the configuration being rolled back upon any test of the at least one test not satisfying at least one pass criterion.

2. The computing system of claim 1, wherein the memory device includes further instructions for providing:
   a configuration management service configured to build the application package based at least in part on the at least one component; and
   a configuration management interface configured to receive the configuration request and send the application package and the instruction to the target computing system.

3. The computing system of claim 1, wherein the memory device includes further instructions to:
   store a configuration specification, the configuration specification being generated based at least in part on the configuration request; and
   index the configuration specification using a client identifier associated with the target computing system.

4. A computer-implemented method of distributing applications, comprising:
   receiving, by a processor, a configuration request that specifies a configuration to be implemented in a target computing system;
   compiling, by the processor, at least one component into an application package, the at least one component including at least one or more software modules for the configuration to be implemented at the target computing system, the at least one component being selected based at least in part on the configuration;
   determining, by the processor, an instruction for installing the application package, the instruction specifying at least one test to be performed with the application package at the target computing system, wherein the at least one test for installing the application package includes one or more sanity tests or one or more validation tests, wherein the one or more sanity tests are configured to determine whether a service referenced by the application package is available at an address, and wherein the one or more validation tests are configured to determine whether functional elements operate within a determined range of functional values;
   sending, by the processor, the application package and the instruction to the target computing system;
   causing, by the processor, the application package to be installed at the target computing system; and
   causing, the processor, the at least one test to be performed at the target computing system, the configuration being rolled back upon any test of the at least one test not satisfying at least one pass criterion.

5. The computer-implemented method of claim 4, further comprising:
generating a configuration specification based at least in part on the configuration request;
storing the configuration specification in a configuration database; and
tracking the configuration for the target computing system.

6. The computer-implemented method of claim 5, wherein tracking the configuration includes storing one or more records about at least one of the configuration request, the target computing system, or the configuration specification.

7. The computer-implemented method of claim 4, further comprising:
storing a sent application package in an application package library; and
indexing the configuration specification by a client in the configuration database using a client identifier associated with the target computing system.

8. The computer-implemented method of claim 4, wherein determining the instruction is based at least in part on at least one of a number of application packages being installed at the target computing system, a test instruction, or a test command.

9. The computer-implemented method of claim 4, wherein the test instruction is configured to perform the one or more sanity tests or the one or more validation tests at the target computing system, and the test command comprises command information to execute the application package at the target computing system.

10. The computer-implemented method of claim 7, further comprising generating a failure message when the one or more sanity tests or the one or more validation tests occur, wherein the failure message includes an indication of at least a type of test that faded.

11. The computer-implemented method of claim 4, wherein the instruction further specifies at least one test to be performed to complete installation of the application package after failure of the instruction.

12. The computer-implemented method of claim 4, wherein the target computing system includes a plurality of processing devices, and wherein the instruction for installing the application package specifies installation on at least a subset of the plurality of processing devices.

13. The computer-implemented method of claim 4, wherein the target computing system comprises at least one of a local development computing environment, a networked development computing environment, or a production computing environment.

14. The computer-implemented method of claim 4, wherein compiling the at least one component into the application package is performed by a deployment manager, and wherein the deployment manager comprises at least one of a configuration management service or a configuration management interface, the configuration management interface being implemented as an web service interface.

15. A non-transitory computer-readable storage medium storing one or more sequences of instructions executable by one or more processors to:
receive a configuration request that specifies a configuration to be implemented in a target computing system;
compile at least one component into an application package, the at least one component including at least one or more software modules for the configuration to be implemented at the target computing system, the at least one component being selected based at least in part on the configuration;
determine an instruction for installing the application package, the instruction specifying at least one test to be performed with the application package at the target computing system, wherein the at least one test for installing the application package includes one or more sanity tests or one or more validation tests, wherein the one or more sanity tests are configured to determine whether a service referenced by the application package is available at an address, and wherein the one or more validation tests are configured to determine whether functional elements operate within a determined ran e of functional values;
send the application package and the instruction to the target computing system;
cause the application package to be installed at the target computing system; and
cause the at least one test to be performed at the target computing system, the configuration being rolled back upon any test of the at least one test not satisfying at least one pass criterion.

16. The non-transitory computer-readable storage medium of claim 15, wherein the configuration request is received at a deployment manager, the deployment manager including at least one of a configuration management service or a configuration management interface.

17. The non-transitory computer-readable storage medium of claim 16, wherein the configuration management service is configured to build the application package based at least in part on the at least one component, and the configuration management interface is configured to send the application package and the instruction to the target computing system.

18. The non-transitory computer-readable storage medium of claim 15, having further instructions to:
store a configuration specification, the configuration specification being generated based at least in part on the configuration request; and
index the configuration specification using a client identifier associated with the target computing system.

* * * * *